US006403915B1

(12) United States Patent
Cook et al.

(10) Patent No.: US 6,403,915 B1
(45) Date of Patent: Jun. 11, 2002

(54) ELECTRODE FOR A PLASMA ARC TORCH HAVING AN ENHANCED COOLING CONFIGURATION

(75) Inventors: David J. Cook, Bradford, VT (US); Charles A. Landry, Plainfield, NH (US); Steve J. Schaefer, White River Junction, VT (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 09/652,444

(22) Filed: Aug. 31, 2000

(51) Int. Cl.[7] .............................................. B23K 10/00
(52) U.S. Cl. ............................. 219/121.52; 219/121.51
(58) Field of Search ....................... 219/121.52, 121.51, 219/121.49, 121.39, 121.48, 121.59, 74, 75

(56) References Cited

U.S. PATENT DOCUMENTS

| | | | | | |
|---|---|---|---|---|---|
| 2,898,441 | A | * | 8/1959 | Reed et al. | 219/75 |
| 3,004,189 | A | | 10/1961 | Giannini | 315/111 |
| 3,930,139 | A | | 12/1975 | Bykhovsky et al. | 219/145 |
| 4,055,741 | A | | 10/1977 | Bykhovsky et al. | 219/121 P |
| 4,133,987 | A | | 1/1979 | Lakomsky et al. | 219/121 P |
| 4,315,732 | A | | 2/1982 | Rowbottam et al. | 431/344 |
| 4,463,245 | A | | 7/1984 | McNeil | 219/121 PM |
| 4,469,311 | A | | 9/1984 | Laing | 266/67 |
| 4,529,863 | A | | 7/1985 | Lebel | 219/137.42 |
| 4,701,590 | A | * | 10/1987 | Hatch | 219/121.52 |
| 4,716,269 | A | * | 12/1987 | Carkhuff | 219/121.51 |
| 4,766,349 | A | | 8/1988 | Johansson et al. | 313/631 |
| 4,787,142 | A | | 11/1988 | Henderson et al. | 29/825 |
| 4,791,268 | A | | 12/1988 | Sanders et al. | 219/121.57 |
| 4,861,962 | A | | 8/1989 | Sanders et al. | 219/121.5 |
| 4,902,871 | A | | 2/1990 | Sanders et al. | 219/121.49 |
| 4,914,271 | A | | 4/1990 | Delzenne et al. | 219/121.48 |
| 4,954,683 | A | | 9/1990 | Hatch | 219/121.5 |
| 4,967,055 | A | | 10/1990 | Raney et al. | 219/121.5 |
| 5,070,227 | A | | 12/1991 | Luo et al. | 219/121.55 |
| 5,097,111 | A | | 3/1992 | Severance, Jr. | 219/121.52 |
| 5,105,061 | A | | 4/1992 | Blankenship | 219/121.52 |
| 5,208,441 | A | | 5/1993 | Broberg | 219/121.52 |
| 5,310,988 | A | | 5/1994 | Couch, Jr. et al. | 219/121.52 |
| 5,464,962 | A | | 11/1995 | Luo et al. | 219/121.52 |
| 5,514,848 | A | | 5/1996 | Ross et al. | 219/121.52 |
| 5,601,734 | A | | 2/1997 | Luo et al. | 219/121.52 |
| 5,856,647 | A | | 1/1999 | Luo | 219/121.5 |
| 5,893,985 | A | | 4/1999 | Luo et al. | 219/121.48 |
| 5,965,040 | A | | 10/1999 | Luo et al. | 219/121.5 |

* cited by examiner

*Primary Examiner*—Teresa Walberg
*Assistant Examiner*—Quang Van
(74) *Attorney, Agent, or Firm*—Testa, Hurwitz & Thibeault, LLP

(57) ABSTRACT

An electrode having a ribbed configuration providing a large surface area for cooling the electrode. The electrode includes an elongated electrode body having a first end and a second end. The electrode also includes a shoulder having an enlarged diameter body integral with the electrode body. The shoulder has an imperforate face toward the first end and at least one rib extending aft of the face towards the second end of the electrode body.

50 Claims, 3 Drawing Sheets

ELECTRODE FOR A PLASMA ARC TORCH HAVING AN ENHANCED COOLING CONFIGURATION

FIELD OF THE INVENTION

The invention relates generally to the field of plasma arc torches and systems. In particular, the invention relates to an electrode for use in a plasma arc torch having an enhanced cooling configuration.

BACKGROUND OF THE INVENTION

Plasma arc torches are widely used in the processing (e.g., cutting and marking) of metallic materials. A plasma arch torch generally includes a torch body, an electrode mounted within the body, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. The gas can be non-reactive, e.g. nitrogen or argon, or reactive, e.g. oxygen or air.

In process of plasma arc cutting or marking a metallic workpiece, a pilot arc is first generated between the electrode (cathode) and the nozzle (anode). The pilot arc ionizes gas passing through the nozzle exit orifice. After the ionized gas reduces the electrical resistance between the electrode and the workpiece, the arc then transfers from the nozzle to the workpiece. The torch is operated in this transferred plasma arc mode, characterized by the conductive flow of ionized gas from the electrode to the workpiece, for the cutting or marking the workpiece.

U.S. Pat. No. 4,902,871, assigned to Hyperthemi, Inc. describes and claims an apparatus and method for cooling a "spiral groove" electrode in a contact start torch. A gas flow passage, preferably a spiral fin machined on the outer side surface of the shoulder portion, diverts a portion of the gas flow from the plasma chamber to a region above the electrode where it is vented to atmosphere. The fin is machined to form a spiral groove that is sufficiently constricted that a substantial pressure drop appears along the path, while allowing a sufficient gas flow to produce the desired cooling. The adjacent portions of the spiral fin are preferably closely spaced to enhance the surface area of the electrode in a heat transfer relationship with the cooling gas flow.

While spiral groove electrodes operate as intended, applicants have perceived the need for an alternative form of the electrode which is simpler to manufacture, but still provides the same benefits as the spiral groove electrode.

SUMMARY OF THE INVENTION

The present invention resides in the recognition that an electrode having a ribbed configuration is easy to manufacture and provides a large surface area for cooling the electrode. The ribbed configuration provides for a plurality of independent cooling passages that extend from a first (front) end to a second (aft) end of the electrode. In one embodiment, the electrode includes an elongated electrode body having a first end and a second end. The electrode also includes a shoulder having an enlarged diameter body integral with the electrode body. The shoulder has an imperforate face toward the first end and at least one rib extending aft of the face towards the second end of the electrode body.

The at least one rib has a varying height forming at least one groove in the shoulder body of varying depth. In one embodiment, the depth of each groove is greater toward the second end of the electrode than toward the first end. The at least one rib has an orientation between limits of being longitudinally aligned and substantially circumferentially disposed relative to the electrode body. As stated previously, these grooves act as independent, parallel cooling passages that provide a large surface area and facilitate substantial cooling of the electrode.

In a detailed embodiment, the electrode can comprise a high thermal conductivity material (e.g., copper) and can have an insert disposed in a bore formed in at least one of the first end and the second end. The insert can comprise a high thermionic emissivity material (e.g., hafnium or zirconium), and the shoulder can have an enlarged body of constant diameter that includes a plurality of ribs (and grooves).

The present invention also features a method of cooling an electrode in a torch body of a plasma arc torch. The torch includes a nozzle disposed relative to the electrode and a swirl ring to define a plasma chamber. The electrode is provided comprising an elongated electrode body having a first end and a second end. The electrode also includes a shoulder having an enlarged diameter body integral with the electrode body. The shoulder has an imperforate face toward the first end and a plurality of ribs extending aft of the face toward the second end of the electrode. A flow of pressurized gas is directed to the plasma chamber via the swirl ring. A portion of the pressurized plasma gas is directed through the plurality of grooves between the ribs to a rear chamber. The grooves act as parallel, independent cooling paths to cool the electrode.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being place on illustrating the principles of the present invention.

DETAILED DESCRIPTION

Figure 1:
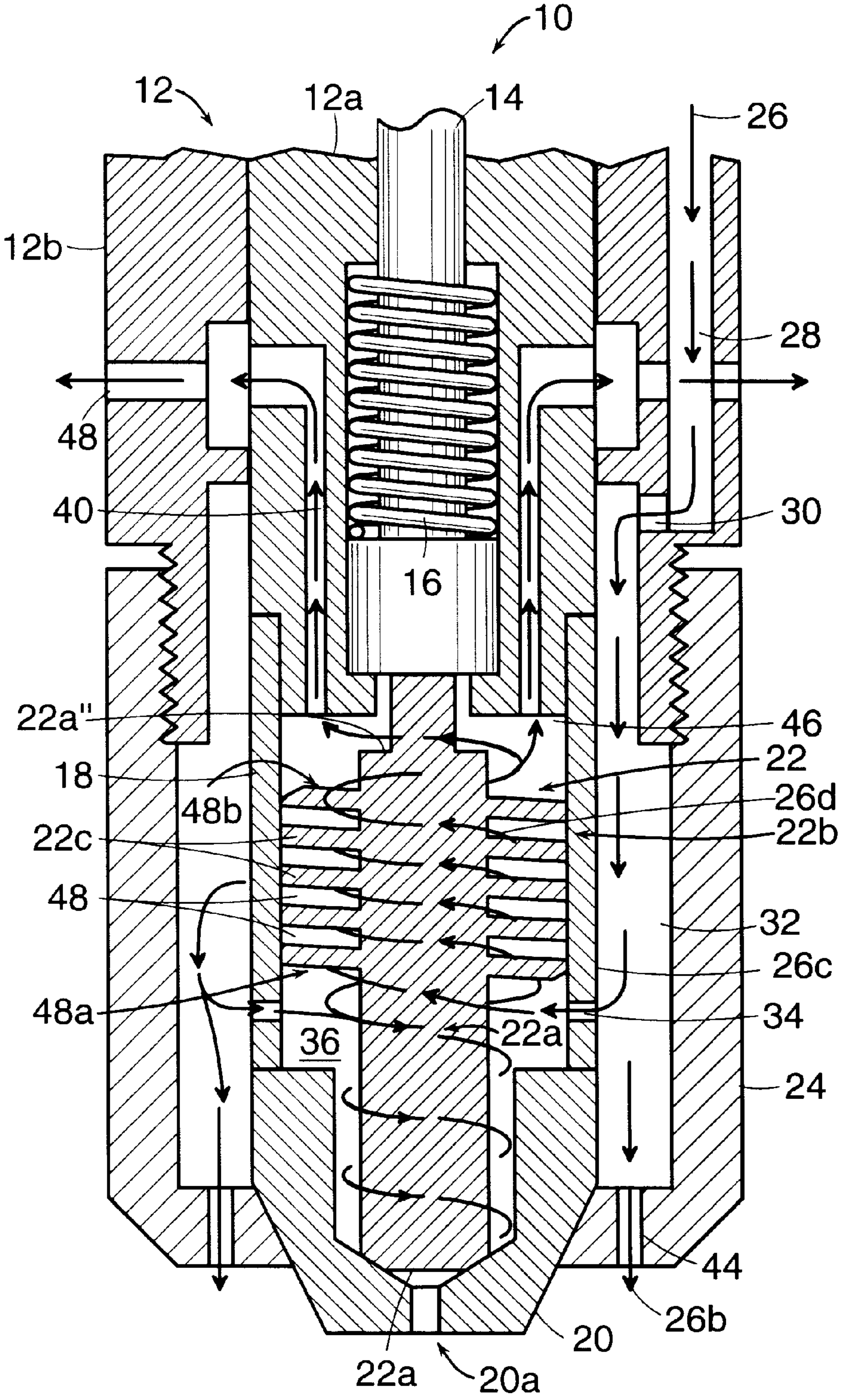
FIG. 1 PRIOR ART
FIG. 1 is a perspective view of a conventional plasma arc cutting torch having an electrode with a spiral groove.

FIG. 1 depicts a plasma arc torch 10 of the type described and claimed in U.S. Pat. No. 4,902,871, the specification of which is hereby incorporated by reference. As shown, the torch 10 has a torch body 12 with an inner component 12*a* and an outer component 12*b*, a plunger 14 and a spring 16 that drives the plunger downwardly, as shown. Consumable parts of the torch 10 include a swirl ring 18 secured to the lower end of the body component 12*a*, a nozzle 20 with a central plasma arc exit orifice 20*a*, an electrode 22, and a retaining cap 24 threaded onto the body component 12*b* at its lower end. The cap 24 captures the nozzle and holds it in place. The electrode 22 is slidable axially (shown in the vertical direction) within the swirl ring 18. In a starting position, the lower end face 22*a* of the electrode 22 closes off the exit orifice 20*a*. In the operating position, an upper surface 22*a*" of the body portion of the electrode either abuts or is near the lower end of the body component 12*a* and the nozzle exit orifice 20*a* is open. The movement of the electrode 22 is accomplished using fluid forces.

A pressurized plasma gas flow 26 enters the torch via passage 28, port or ports 30, an annular passage 32 and canted ports 34 in the swirl ring 18, finally entering a plasma chamber 36 defined by the electrode, the swirl ring and the nozzle. The plasma gas flow 26, except for a portion 26*b* that exits the cap through the holes 44, passes through the canted ports 34 to enter the plasma chamber 36 which pressurizes the chamber to create a fluid lifting force acting on the lower surfaces of the electrode. This force overcomes the spring force causing the electrode to move upwardly to its operating position. The pilot arc produced as the electrode breaks electrical connection with the anode initiates a plasma arc, which exits the torch through the orifice 20*a* and attaches to a workpiece to be cut or marked. When the electrode is raised, the main gas flow 26*c* in the plasma chamber 36 has a swirling motion about the lower electrode body portion 22*a*. The flow 26*b* through the cap holes 44 serves to cool torch parts other than t he electrode.

As shown, a gas flow passage 48 formed in the electrode extends from a first end 48*a* in fluid communication with the plasma chamber 36 and a second end 48*b* in fluid communication with the region above the electrode 46. The passage 48 is a spiral groove formed in the outer side wall of the shoulder portion 22*b* of the electrode. The passage 48 acts as a serial cooling path for a cooling gas flow 26*d*. The cross-sectional dimensions, the length, and the configuration of the passage are such that the cooling gas flow 26*d* travels up the passage to the region above the electrode 46, but the passage is sufficiently restrictive to the flow that there is substantial pressure drop along the passage.

Figure 2A:
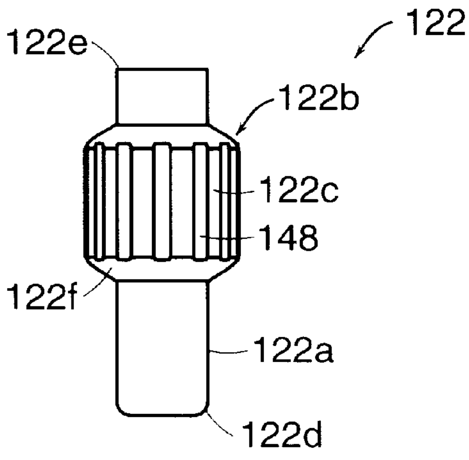
FIG. 2A is a perspective view of an electrode having a shoulder with a plurality of ribs incorporating the principles of the present invention.
Figure 2B:
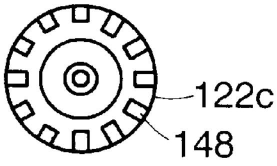
FIG. 2B is a top view of the electrode of FIG. 2A.
Figure 2C:
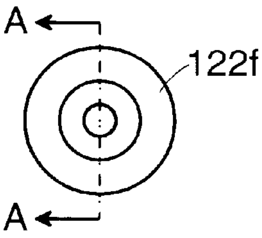
FIG. 2C is a bottom view of the electrode of FIG. 2A.

FIGS. 2A–2C illustrate an embodiment of an electrode of the present invention. The electrode of the present invention can replace the electrode 22 of FIG. 1 (see FIG. 4). In FIG. 2A the electrode 122 has an elongated electrode body portion 122*a* and a shoulder portion 122*b* having an enlarged substantially constant diameter integral with the electrode body portion 122*a*. The shoulder 122*b* can have a substantially constant diameter. The elongated electrode body portion 122*a* has a first end 122*d* and a second end 122*e*. The electrode 122 has multiple ribs 122*c* and corresponding grooves 148 formed in the shoulder 122*b* portion of the electrode 122. The ribs 122*c* are disposed aft of an imperforate face 122*f* and extend toward the second end 112*e* of the electrode body portion 122*a*. The imperforate face 122*f* of electrode 122 can be substantially flat to increase the "blow back" of the electrode 122 when the plasma arc is started.

In one embodiment, the ribs 122*c* and grooves 148 can be longitudinally aligned relative to a central axis (CA) (FIG. 3) extending through the body. In another embodiment, the ribs 122*c* and grooves 148 can be substantially circumferentially disposed relative to the electrode body. In other embodiments, the ribs 122*c* and grooves 148 can be aligned anywhere between longitudinally aligned or circumferentially disposed relative to the electrode body. In addition, the ribs (and grooves) can have a constant or varying thickness.

The electrode 122 can be manufactured from of a high thermal conductivity material. The high thermal conductivity material can be copper, silver, gold, platinum, or any other high thermal conductivity material with a high melting and boiling point and which is chemically inert in a reactive environment A high thermal conductivity can be any metal or alloy having a thermal conductivity greater than 40 Btu/hr ft ° F.

The grooves 148 can be formed using a key-cutter sawing operation, or by any other method known to those skilled in the art.

Figure 3:
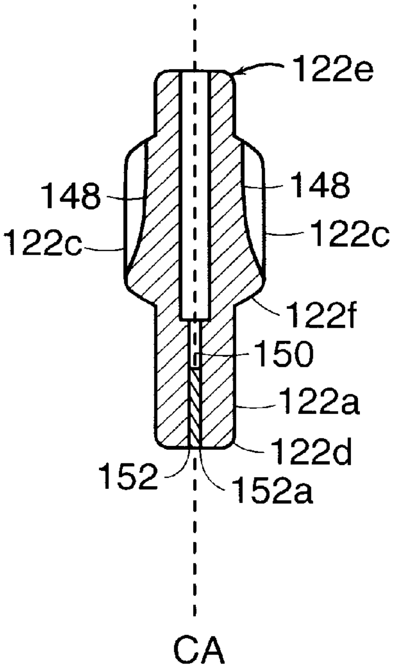
FIG. 3 is cross-sectional view of the electrode along axes A—A of FIG. 2C.

FIG. 3 is a cross-sectional view along section A—A of FIG. 2C of the electrode 122. As shown, the depth of the grooves 148 increases from the first end 122*d* toward the second end 122*e* of the electrode 122. The electrode 122 has a bore 150 formed in the first end 122*d* of the electrode 122. The bore 150 can be formed by drilling into the electrode body 122*a* along a central axis (CA) extending longitudinally through the body. An insert 152 comprising high thermionic emissivity material (e.g., hafnium or zirconium) is press fit in the bore 150. A high thermionic emissivity can be defined as a relatively low work function, in a range between about 2.7 to 4.2 eV. The insert 152 includes a closed end 152*a* which defines an emission surface. The emission surface 152*a* is exposable to plasma gas in the torch body.

Figure 4:
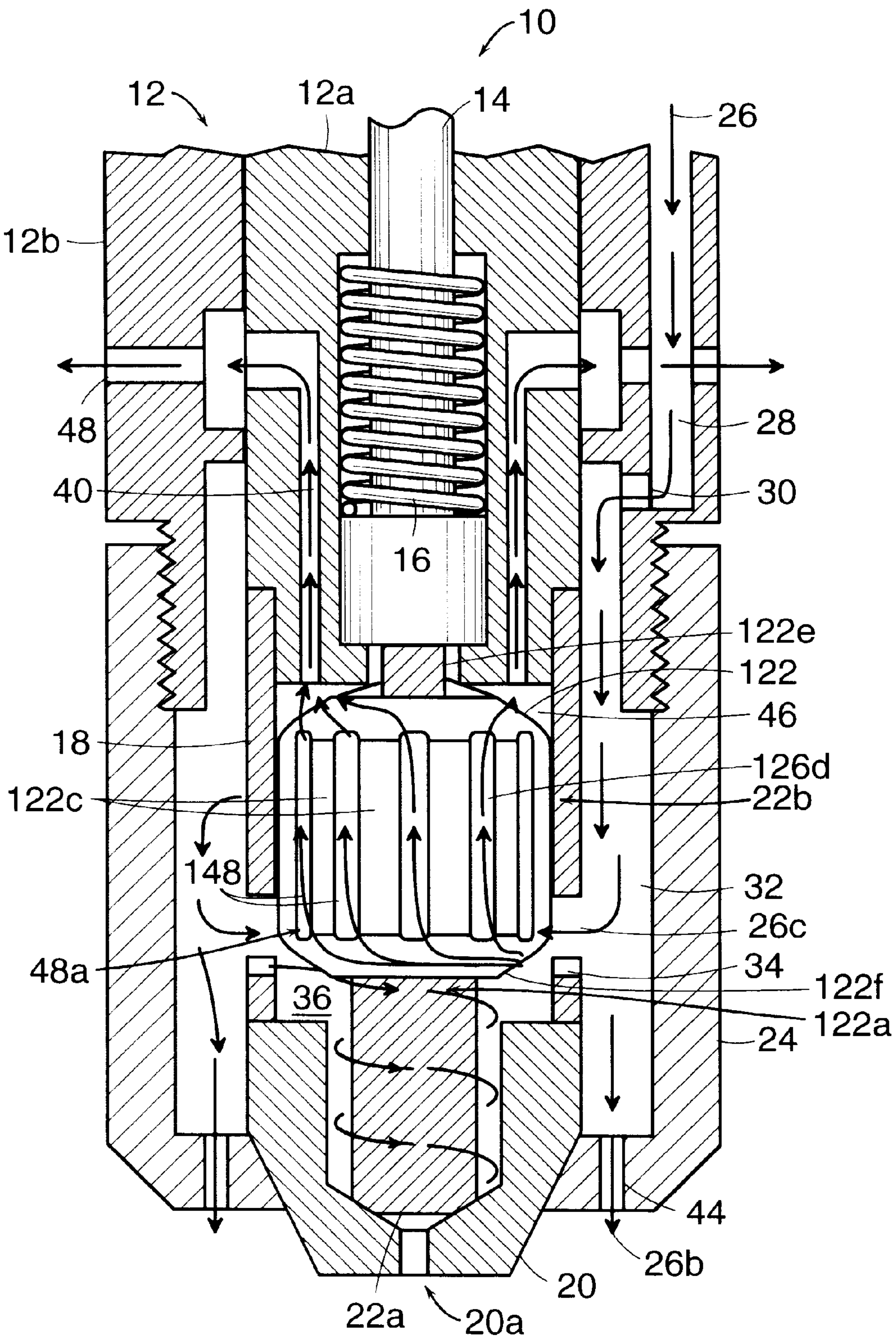
FIG. 4 is a perspective view of a conventional plasma arc cutting torch having an electrode with a ribbed configuration.
Figure 4:
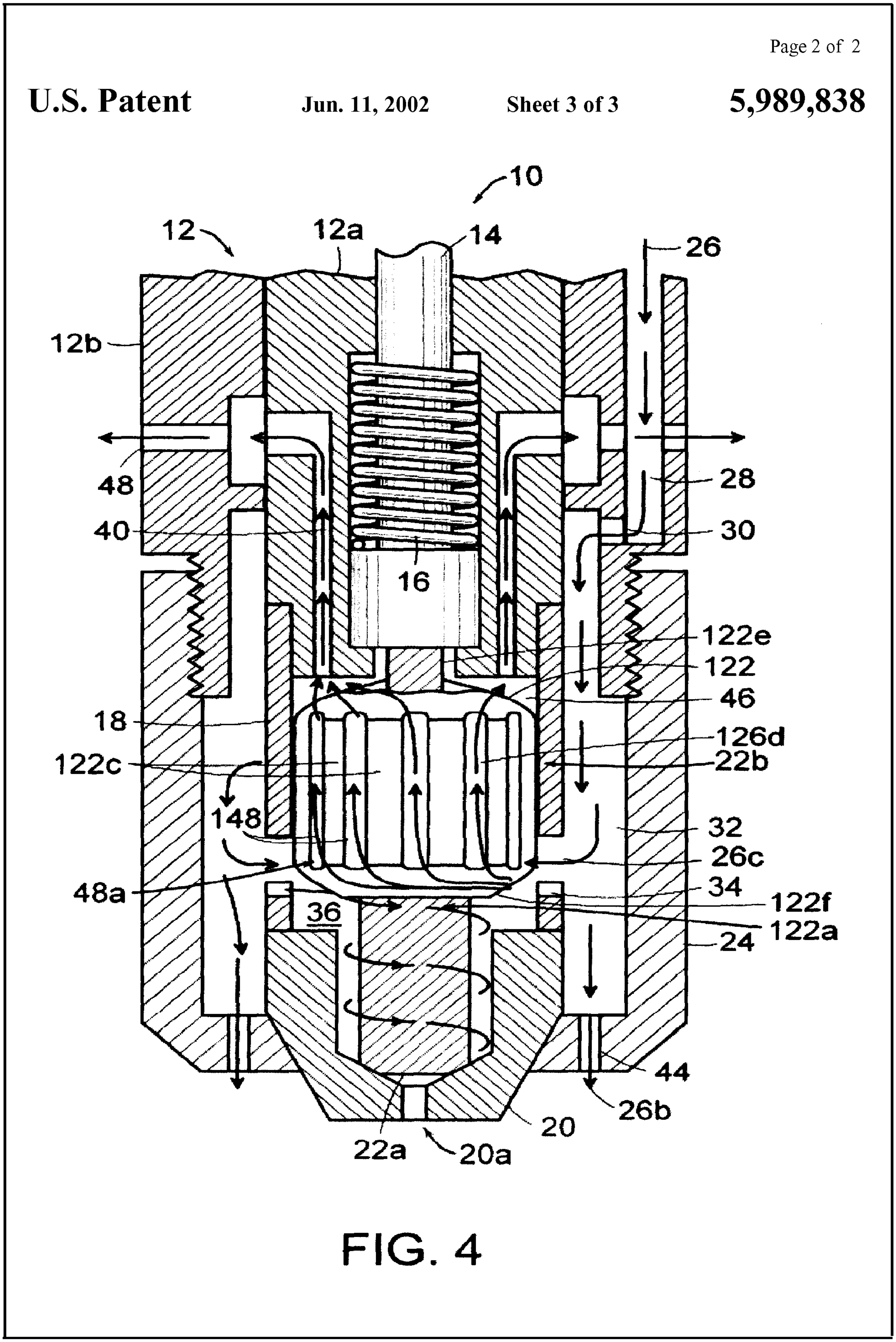

FIG. 4 shows electrode 122 installed in a plasma arc torch 10. In FIG. 4, like parts are identified with the same reference number as used in FIG. 1. A principal feature of the invention is the plurality of grooves 148 which form multiple, parallel, independent gas flow passages in the electrode 122 from the imperforate face 122*f*. The cross-sectional dimensions, the length, and the orientation of the grooves 148 are configured such that cooling gas flows 126*d* travel through each groove 148 to the region 46 aft of the electrode 122. The grooves 148 are dimensioned to produce a substantial pressure drop in the gas flow passing through the groove passages. The velocity of the cooling gas flows 126*d* decreases as the gas flows into grooves 148 past the ribs 122*c* toward the second end of the electrode 122*e*.

The plurality of ribs 122*c* act as heat transfer surfaces for cooling the electrode 122. As such, an increased the surface area of the electrode is exposed to the cooling gas flows 126*d* resulting in more effective cooling of the electrode 122. The plurality of grooves 148 allow multiple cooling gas flows 126*d* to flow through the shoulder 122*b* of the electrode 122.

Because there is a substantial pressure drop through the grooves 148, and because of the large surface area of the imperforate face 122*f*, the gas flow 26*c* pressurizes the chamber 36 rapidly with only a small pressure acting on the opposite surfaces of the electrode in the region above the electrode 46. This pressurization "blows back" the electrode against the force of the spring 16 allowing the flow 26*c* in the plasma chamber to assume an unrestricted swirling pattern, which is conducive to the formation of a stable plasma arc. The electrode 22 of the present invention therefore provides both an effective cooling process as well as reliable contact starting.

While the invention has been described with respect to its preferred embodiments, it will be understood that various modifications and alterations will occur to those skilled in the art from the foregoing detailed description and the accompanying drawings. For example, while the invention has been described with respect to an electrode that moves axially for contact starting, the features of the present invention could be applied to a stationary electrode. Further, while the electrode has been described as moving within a swirl ring as a guide and support element, it will be understood that it could be mounted to move within the torch body or some other replaceable torch component. Therefore, as used herein, "torch body" should be interpreted to include the swirl ring or other component acting as a guide and support for the electrode. These and other modifications and variations are intended to fall within the scope of the pending claims.

What is claimed is:

1. An electrode for a plasma arc torch, the electrode comprising:

an elongated electrode body having a first end and a second end; and a shoulder having an enlarged diameter body integral with the electrode body, the shoulder having:

an imperforate face toward the first end; and at least one rib extending aft of the face towards the second end of the electrode body, wherein the at least one rib has a varying height, thereby forming at least one groove in the shoulder body of varying depth.

2. The electrode of claim 1 wherein the depth of the at least one groove is greater toward the electrode second end than toward the electrode first end.

3. The electrode of claim 1 further comprising a second rib having a varying height thereby forming a second groove in the shoulder body of varying depth.

4. The electrode of claim 1 wherein the at least one rib has an orientation between limits of being longitudinally aligned and substantially circumferentially disposed relative to the electrode body.

5. The electrode of claim 1 further comprising a second rib extending aft of the face towards the second end of the electrode body so as to form with the at least one rib a groove therebetween.

6. The electrode of claim 1 wherein the electrode comprises a high thermal conductivity material.

7. The electrode of claim 1 further comprising an insert disposed in a bore formed in at least one of the first end and the second end.

8. The electrode of claim 7 wherein the insert comprises a high thermionic emissivity material.

9. The electrode of claim 1 wherein the shoulder has a substantially constant diameter.

10. The electrode of claim 1 further comprising a plurality of ribs.

11. The electrode of claim 10 wherein the plurality of ribs have a varying height, thereby, forming a plurality of grooves of varying depth.

12. The electrode of claim 1 wherein the imperforate face is substantially flat.

13. An electrode for a plasma arc torch comprising:

an elongated electrode body having a first end and a second end with a bore disposed in the first end of the electrode body;

an insert disposed in the bore; and a shoulder with an enlarged diameter integral with the elongated electrode body, the shoulder having:

an imperforate face toward the first end; and a plurality of ribs extending from the face toward the second end of the body.

14. A plasma arc torch comprising:

a torch body;

an electrode supported by the torch body, the electrode comprising an elongated electrode body having a first end and a second end; and a shoulder having an enlarged diameter body integral with the electrode body, the shoulder having an imperforate face toward the first end; and at least one rib extending aft of the face towards the second end of the electrode body, wherein the at least one rib has a varying height, thereby forming at least one groove in the shoulder body of varying depth;

a nozzle supported by the torch body in a spaced relationship with the elongated electrode body to define a plasma chamber; and a swirl ring supported by the torch body in a slidably fitting relationship with the shoulder of the electrode.

15. The plasma torch of claim 13 wherein the slidably fitting relationship between the shoulder of the electrode and the swirl ring permits a plasma gas to flow upward past the at least one rib.

16. The plasma torch of claim 13 wherein the depth of the at least one groove is greater toward the electrode second end than toward the electrode first end.

17. The plasma torch of claim 13 further comprising a second rib having a varying height thereby forming a second groove in the shoulder body of varying depth.

18. The plasma torch of claim 13 wherein the at least one rib has an orientation between limits of being longitudinally aligned and substantially circumferentially disposed relative to the electrode body.

19. The plasma torch of claim 13 wherein a velocity of the plasma gas decreases as the plasma gas flows past the at least one rib.

20. The plasma torch of claim 13 wherein a pressure of the plasma gas decreases as the plasma gas flows past the at least one rib.

21. The plasma torch of claim 13 wherein the plasma gas passing through the face of the shoulder is substantially restricted.

22. The plasma torch of claim 13 wherein the electrode comprises a high thermal conductivity material.

23. The electrode of claim 13 wherein the electrode body has a bore disposed in at least one of the first end and the second end of the electrode body and further comprising an insert comprising a high thermionic emissivity material disposed in the bore.

24. The plasma arc torch of claim 13 wherein the imperforate face of the electrode is substantally flat.

25. A method of cooling an electrode mounted in a torch body of a plasma torch in a spaced relationship with a nozzle to define a plasma chamber and in a slidably fitting relationship with a swirl ring, the method comprising:

a) providing an electrode comprising an elongated electrode body having a first end and a second end and a shoulder integral having ribs with the electrode body having an imperforate face toward the first end, wherein the ribs have a varying height, thereby forming at least one groove in the shoulder body of varying depth;

b) directing a flow of pressurized gas to the plasma chamber; and c) diverting a portion of the pressurized plasma gas through a plurality of ribs provided along the shoulder extending aft of the face toward the second end of the electrode body.

26. The method of claim 25 wherein step b) comprises diverting a portion of the pressurized plasma gas through the plurality of ribs to cool the electrode.

27. The method of claim 25 wherein step b) comprises diverting a portion of the pressurized plasma gas through the plurality of ribs to reduce a pressure of the gas passing by the plurality of ribs.

28. An electrode for a plasma arc torch, the electrode comprising:

an elongated electrode body having a first end and a second end; and a shoulder having an enlarged diameter body integral with the electrode body, the shoulder having:

an imperforate face toward the first end; and at least one rib extending from the face towards the second end of the electrode body.

29. The electrode of claim 28 wherein the at least one rib has a varying height, thereby forming at least one groove in the shoulder body of varying depth.

30. The electrode of claim 29 wherein the depth of the at least one groove is greater toward the electrode second end than toward the electrode first end.

31. The electrode of claim 29 further comprising a second rib having a varying height thereby forming a second groove in the shoulder body of varying depth.

32. The electrode of claim 28 wherein the at least one rib has an orientation between limits of being longitudinally aligned and substantially circumferentially disposed relative to the electrode body.

33. The electrode of claim 28 further comprising a second rib extending aft of the face towards the second end of the electrode body so as to form with the at least one rib a groove therebetween.

34. The electrode of claim 28 wherein the electrode comprises a high thermal conductivity material.

35. The electrode of claim 28 further comprising an insert disposed in a bore formed in at least one of the first end and the second end.

36. The electrode of claim 35 wherein the insert comprises a high thermionic emissivity material.

37. The electrode of claim 28 wherein the shoulder has a substantially constant diameter.

38. The electrode of claim 28 further comprising a plurality of ribs.

39. The electrode of claim 38 wherein the plurality of ribs have a varying height, thereby forming a plurality of grooves of varying depth.

40. A plasma arc torch comprising:

a torch body;

an electrode supported by the torch body, the electrode comprising an elongated electrode body having a first end and a second end; and a shoulder having an enlarged diameter body integral with the electrode body, the shoulder having an imperforate face toward the first end; and at least one rib extending from the face towards the second end of the electrode body;

a nozzle supported by the torch body in a spaced relationship with the elongated electrode body to define a plasma chamber; and a swirl ring supported by the torch body in a slidably fitting relationship with the shoulder of the electrode.

41. The plasma torch of claim 40 wherein the slidably fitting relationship between the shoulder of the electrode and the swirl ring permits a plasma gas to flow upward past the at least one rib.

42. The plasma torch of claim 40 wherein the at least one rib has a varying height, thereby forming at least one groove in the shoulder body of varying depth.

43. The plasma torch of claim 42 wherein the depth of the at least one groove is greater toward the electrode second end than toward the electrode first end.

44. The plasma torch of claim 42 further comprising a second rib having a varying height thereby forming a second groove in the shoulder body of varying depth.

45. The plasma torch of claim 40 wherein the at least one rib has an orientation between limits of being longitudinally aligned and substantially circumferentially disposed relative to the electrode body.

46. The plasma torch of claim 40 wherein a velocity of the plasma gas decreases as the plasma gas flows past the at least one rib.

47. The plasma torch of claim 40 wherein a pressure of the plasma gas decreases as the plasma gas flows past the at least one rib.

48. The plasma torch of claim 40 wherein the plasma gas passing through the face of the shoulder is substantially restricted.

49. The plasma torch of claim 40 wherein the electrode comprises a high thermal conductivity material.

50. The electrode of claim 40 wherein the electrode body has a bore disposed in at least one of the first end and the second end of the electrode body and further comprising an insert comprising a high thermionic emissivity material disposed in the bore.

* * * * *

UNITED STATES PATENT AND TRADEMARK OFFICE

CERTIFICATE OF CORRECTION

PATENT NO. : 6,403,915 B1
DATED : June 11, 2002
INVENTOR(S) : Cook et al.

It is certified that error appears in the above-identified patent and that said Letters Patent is hereby corrected as shown below:

Column 5,
Line 46, please delete "," after the word "thereby";
Line 58, please delete "ribs extending" and insert -- ribs formed in the shoulder and extending --;

Column 6,
Lines 11, 15, 18, 21, 25, 28, 31, 34, 36 and 41, please delete "13" and replace with -- 14 --;

Column 7,
Line 8, please delete "rib extending" and insert -- rib formed in the shoulder and extending --;

Column 8,
Line 4, please delete "rib extending" and insert -- rib formed in the shoulder and extending --.

Signed and Sealed this

Twenty-ninth Day of October, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 6,403,915 B1
DATED : June 11, 2002
INVENTOR(S) : Cook et al.

It is certified that error appears in the above-identified patent and that said Letters Patent is hereby corrected as shown below:

Drawings,
Replace FIG. 4 with the drawing sheet attached.

Signed and Sealed this

Thirtieth Day of May, 2006

JON W. DUDAS
*Director of the United States Patent and Trademark Office*